C. G. WARD.
SAFETY RAZOR.
APPLICATION FILED MAY 8, 1907.

946,949.

Patented Jan. 18, 1910.

UNITED STATES PATENT OFFICE.

CHARLES G. WARD, OF CHICAGO, ILLINOIS, ASSIGNOR TO THE WARD SAFETY RAZOR COMPANY, OF CHICAGO, ILLINOIS, A CORPORATION OF MAINE.

SAFETY-RAZOR.

946,949.     Specification of Letters Patent.     Patented Jan. 18, 1910.

Application filed May 8, 1907. Serial No. 372,598.

*To all whom it may concern.*

Be it known that I, CHARLES G. WARD, a citizen of the United States, residing at Chicago, in the county of Cook and State of Illinois, have invented certain new and useful Improvements in Safety-Razors, of which the following is a description, reference being had to the accompanying drawing, forming part of this specification.

My invention has for its object the production of a safety razor which may be used in the same manner as the ordinary blade razor, and which shall be simple in construction and efficient in operation, and in which the blades may be readily removed and replaced. Its novelty will be hereinafter set forth, and particularly pointed out in my claims.

Figure 1:
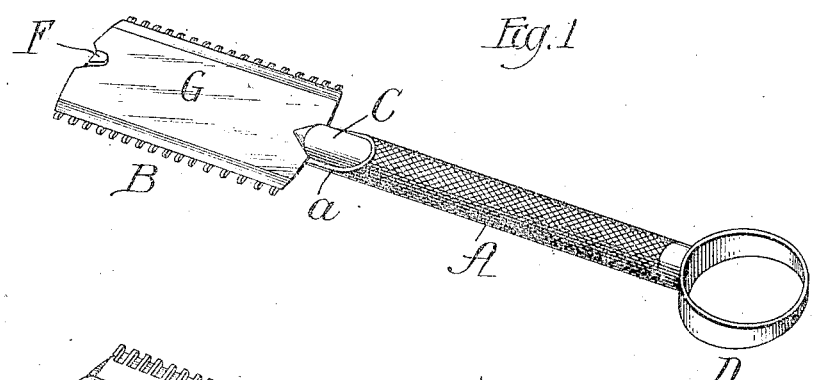
Figure 2:
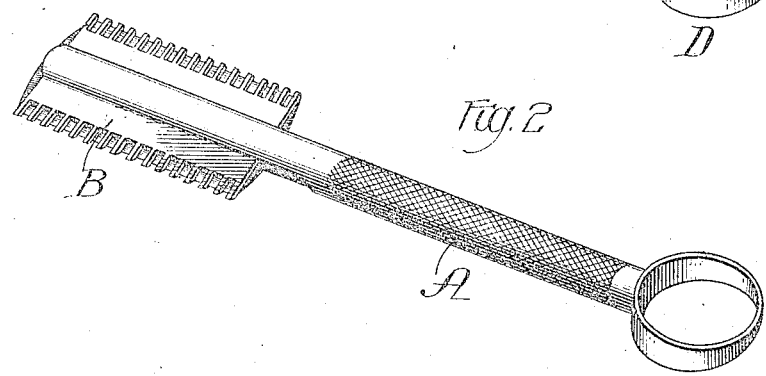
Figure 3:
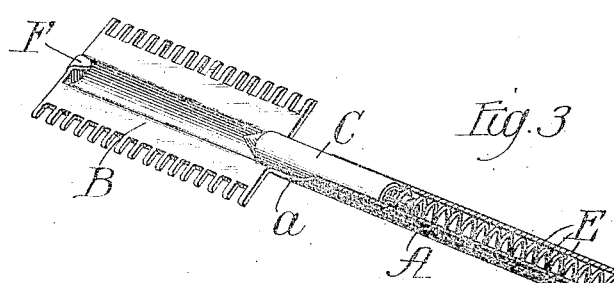
Figure 4:
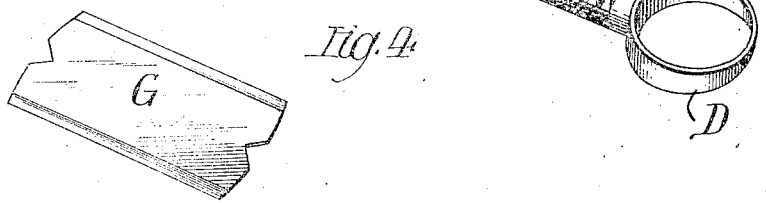

In the accompanying drawings, Figure 1 is a perspective view of the front or blade side of my improved razor; Fig. 2 a corresponding view of the back side thereof; Fig. 3 a similar view of the front side of the razor, with the blade removed and the tubular handle broken away to expose the inner end of the retaining plunger and the coiled spring contained in said handle; and Fig. 4 a perspective view of the removable blade.

The same letters of reference are used to indicate corresponding parts in the several views.

As will be observed from the drawings, my improved razor comprises a blade and blade-holder, and a handle extending from one end thereof and in line therewith, and in the present instance terminating in a ring for the reception of the little finger of one's hand when using the razor, and by which the razor may also be hung up when not in use.

In the present instance both the handle A and the blade-holding portion B are formed from a single piece of metal tubing. For the handle portion the tubing is allowed to retain its tubular form, but at the junction of the handle portion and the blade-holding portion the tubing is cut cross-wise through its upper or forward side to a point about midway through the tubing and is also slit longitudinally along its middle and then flattened out as shown and provided with guard teeth upon its opposite edges. The tubular handle portion is cut away as shown at *a* adjacent the point of junction of the handle and holder, to expose the end of the retaining plunger C, which is inserted in the handle from the open end thereof adjacent the blade-holder. The opposite end of the tubular handle is closed by the ring D, which is soldered or otherwise firmly secured thereto. Confined within the handle, and serving to press the plunger C outward, is a coiled spring E. This spring may simply bear against the end of the plunger and press it outward, and a suitable stop be provided to limit the outward movement of the plunger; but in the present instance I provide the plunger with a reduced inner end, to which I secure the adjacent end of the spring E. For the major portion of its length the spring E is of sufficiently less diameter than the interior of the tubular handle to permit the spring to be freely compressed and to freely expand, but in the present instance I make the extreme end of the spring opposite the plunger of sufficiently larger diameter than the body of the spring to cause it to snugly fit the internal bore of the handle, so that after the spring is forced into place the friction of its enlarged end within the handle will serve to retain it and the plunger in position and prevent accidental displacement of the latter, the length of the spring being such that when in place it will tend to press the plunger outward to approximately the position shown in Fig. 3.

At its end opposite the plunger the blade-holder B is provided with a retaining lug or hook F, which hook and the spring-pressed plunger are adapted to coöperate with V-shaped notches in the opposite ends of the removable blade G to secure the latter in place upon the holder, the projecting end of the plunger D being suitably rounded off or pointed to engage and fit the notch in the adjacent end of the blade. The removable blade G is formed of thin sheet steel having its opposite edges properly ground and sharpened, and it is firmly held in place upon the flat surface of the holder B by the engagement of the retainer F with its outer end and the spring-pressed plunger C with its inner end. In practice a considerable number of such blades will be supplied with each razor. To remove one blade and substitute another it is simply necessary to press the plunger C downward into the handle with one's thumb until the blade is released, and to then substitute another blade in its place and permit the plunger to spring outward and engage it.

The surface of the handle is knurled or otherwise roughened, as shown, to enable it to be more securely held in the hand when in use.

As will be understood from the foregoing description I have, by the construction described, produced a razor of very simple and convenient form, which can be economically manufactured, which can be held in the hand and used in the same manner as the ordinary or old-fashioned blade razors, with attendant advantages of the latter, and in which the detachable blades may be removed and replaced with the greatest ease and facility.

In the present instance, and preferably, both sides of the blade-holder B are provided with guard teeth, so that the razor may be used with either the right or the left hand. If designed for use with only one hand, however, only one side of the holder need be provided with such teeth, and when one side of the blade becomes dulled by use its position can be reversed and the opposite side be used.

Having thus fully described my invention, I claim:

1. A safety razor, comprising a blade-holder having a blade-supporting surface and fixed blade-engaging means at one end, a handle extending longitudinally from the opposite end of the holder, spring-pressed blade-engaging means at the end of the holder adjacent the handle, and a flat sheet metal blade removably held in position upon the holder by the fixed and spring-pressed engaging means at its opposite ends; substantially as described.

2. A safety razor, comprising a blade-holder provided with fixed blade-engaging means at one end and spring-pressed blade-engaging means at its opposite end, a flat sheet metal blade provided with notches in its opposite ends adapted to be engaged by said fixed and spring-pressed blade-engaging means, and a handle extending longitudinally from one end of the blade-holder; substantially as described.

3. A safety razor, comprising a blade-holder having blade-engaging means at one end and a tubular handle extending longitudinally from its opposite end, a spring-pressed plunger located in said handle and projecting from its end adjacent the blade-holder, and a blade removably secured in position upon the blade-holder by the blade-engaging means at one end of the holder and the spring-pressed plunger at the other end of it; substantially as described.

4. A safety razor comprising a blade-holder having fixed blade-engaging means at one end and a tubular handle extending longitudinally from its opposite end, a spring-pressed plunger located in said handle and projecting from its end adjacent the blade-holder, and a flat sheet-metal blade provided with notches in its opposite ends adapted to be engaged by said fixed blade-engaging means and said spring-pressed plunger, respectively, to removably secure said blade in position upon the blade-holder; substantially as described.

5. A safety razor, comprising the blade-holder B having the blade-engaging hook or projection F at one end, the tubular handle A extending longitudinally from the opposite end of the holder B, the spring-pressed plunger C located in said tubular handle, and the blade G having the notches in its opposite ends adapted to be engaged by the lug F and spring-pressed plunger C at the opposite ends of the blade-holder to secure the blade in position upon said holder; substantially as described.

6. A safety razor, comprising the handle A and blade-holder B formed from a single piece of tubing, the spring-pressed plunger C located in said handle, and the blade G removably held in place upon the holder B by blade-engaging means at one end of said holder and by the spring-pressed plunger C at its opposite end; substantially as described.

7. A safety razor, comprising the blade-holder B having blade-engaging means at one end, the tubular handle A extending longitudinally from the opposite end of said holder and provided at its free end with the ring D, the spring-pressed plunger C located in the handle A, and the blade G removably secured in position upon the blade-holder by the blade-engaging means at one end of said holder and the spring-pressed plunger C at its opposite end; substantially as described.

CHARLES G. WARD.

Witnesses:
EDWARD RECTOR,
LOUIS B. ERWIN.